(12) United States Patent
Maxson et al.

(10) Patent No.: US 9,399,858 B2
(45) Date of Patent: Jul. 26, 2016

(54) HYBRID INTAKE SCREEN ASSEMBLY

(75) Inventors: Richard Charles Maxson, Maple Grove, MN (US); Gerald Allan Berry, Elk River, MN (US); Garth Hayes Saul, Faribault, MN (US); Michael Richard Ekholm, Minneapolis, MN (US); Timothy Charles Wolf, Andover, MN (US)

(73) Assignee: Bilfinger Water Technologies, Inc., New Brighton, MN (US)

( * ) Notice: Subject to any disclaimer, the term of this patent is extended or adjusted under 35 U.S.C. 154(b) by 432 days.

(21) Appl. No.: 13/598,369

(22) Filed: Aug. 29, 2012

(65) Prior Publication Data

US 2013/0048551 A1 Feb. 28, 2013

Related U.S. Application Data

(60) Provisional application No. 61/529,162, filed on Aug. 30, 2011.

(51) Int. Cl.
| | |
|---|---|
| *E03B 3/04* | (2006.01) |
| *B01D 29/11* | (2006.01) |
| *B01D 35/02* | (2006.01) |
| *E02B 5/08* | (2006.01) |

(52) U.S. Cl.
CPC ............... *E03B 3/04* (2013.01); *B01D 29/111* (2013.01); *B01D 29/114* (2013.01); *B01D 35/02* (2013.01); *E02B 5/08* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 415,927 | A | 11/1889 | Stiles |
| 602,488 | A | 4/1898 | Tice et al. |
| 705,364 | A | 7/1902 | Kurtz |
| 866,560 | A | 9/1907 | Basye |
| 1,274,121 | A | 7/1918 | White |
| 1,633,818 | A | 6/1927 | Kogstrom |
| 1,757,690 | A | 5/1930 | Strindberg |
| 2,014,105 | A | 9/1935 | Dooley |

(Continued)

FOREIGN PATENT DOCUMENTS

| | | |
|---|---|---|
| CA | 2090686 | 1/1993 |
| EP | 0228262 | 7/1987 |

(Continued)

OTHER PUBLICATIONS

The International Bureau of WIPO, International Application No. PCT/US20121/053200 International Preliminary Report on Patentatbility dated Mar. 13, 2014, pp. 1-9.

(Continued)

*Primary Examiner* — Benjamin Kurtz
(74) *Attorney, Agent, or Firm* — Patterson Thuente Pedersen, P.A.

(57) ABSTRACT

An intake screen assembly including an intake member, a screen support member, and a screen member coupled to the screen support member. The screen member may be formed from a material, such as copper-nickel, that is different from a material, such as stainless steel, used to form the intake member and/or the screen support member. The intake screen assembly may include corrosion protection members for preventing contact between the components of the screen assembly that are formed from dissimilar materials. The assembly may be formed by coupling the screen support member to the intake member, and coupling the screen member to the screen support member.

27 Claims, 4 Drawing Sheets

(56) References Cited

U.S. PATENT DOCUMENTS

| | | | |
|---|---|---|---|
| 2,249,020 A | 7/1941 | McFarlin | |
| 2,346,885 A | 4/1944 | Williams et al. | |
| 2,572,173 A | 10/1951 | McFarlin | |
| 2,597,728 A | 5/1952 | Hink | |
| 2,754,003 A | 7/1956 | Fenner | |
| 2,957,579 A | 10/1960 | McCombie | |
| 3,037,636 A | 6/1962 | McFarlin | |
| 3,291,313 A | 12/1966 | Davis | |
| 3,561,605 A | 2/1971 | Likness | |
| 3,643,802 A | 2/1972 | Jackson, Jr. | |
| 3,826,372 A | 7/1974 | Bell | |
| 4,017,394 A | 4/1977 | Hensley | |
| 4,152,264 A | 5/1979 | Hanna, Sr. | |
| 4,261,822 A | 4/1981 | Richardson | |
| 4,411,788 A | 10/1983 | Kimura | |
| 4,618,422 A | 10/1986 | Sasaki et al. | |
| 4,743,370 A | 5/1988 | Mizusawa | |
| 4,822,486 A | 4/1989 | Wilkins et al. | |
| 4,874,510 A | 10/1989 | Akira et al. | |
| 4,973,405 A | 11/1990 | Kozey | |
| 5,230,131 A | 7/1993 | Hobson, Jr. | |
| 5,327,848 A | 7/1994 | Hannon, Jr. | |
| 5,407,570 A | 4/1995 | Hobson, Jr. | |
| 5,525,222 A | 6/1996 | Gleason et al. | |
| 6,036,850 A | 3/2000 | Reynolds | |
| 6,051,131 A | 4/2000 | Maxson | |
| 6,066,253 A | 5/2000 | Idland et al. | |
| 6,682,651 B1 | 1/2004 | Toland et al. | |
| 6,712,959 B2 | 3/2004 | Ekholm et al. | |
| 6,915,910 B2 * | 7/2005 | Lutz et al. | 210/485 |
| 6,949,198 B2 | 9/2005 | Reber | |
| 7,273,545 B1 | 9/2007 | Lloyd | |
| 7,575,677 B1 | 8/2009 | Barnes | |
| 7,794,589 B2 | 9/2010 | Kosey | |
| 7,950,527 B2 | 5/2011 | Osborne et al. | |
| 8,192,622 B2 | 6/2012 | Kozey | |
| 2003/0029780 A1 | 2/2003 | Ekholm et al. | |
| 2003/0153943 A1 | 8/2003 | Michael et al. | |
| 2007/0175834 A1 * | 8/2007 | Osborne et al. | 210/767 |
| 2008/0061010 A1 | 3/2008 | Tom | |
| 2011/0290743 A1 | 12/2011 | Osborne et al. | |
| 2012/0125828 A1 | 5/2012 | Watson | |

FOREIGN PATENT DOCUMENTS

| | | |
|---|---|---|
| EP | 1818089 | 8/2007 |
| GB | 2075364 | 11/1981 |
| JP | 04190807 | 7/1992 |
| WO | WO 03/091536 | 11/2003 |

OTHER PUBLICATIONS

PCT International Search Report and Written Opinion for International Application No. PCT/US2012/053200 dated Nov. 27, 2012.
Canadian Patent Office; Office Action dated Apr. 22, 2009 from Canadian Patent Application No. 2,574,255; 3 pages.
European Patent Office; European Search Report dated May 15, 2007, mailed Jun. 1, 2007, for European Patent Application No. 07100728.0, 3 pages.
International Search Report and Written Opinion for PCT/US2013/057054 dated Feb. 3, 2014, pp. 1-7.
International Search Report for PCT/US2012/053200 for Australian Patent Applicaton No. 2012301854, dated Nov. 20, 2012.

* cited by examiner

HYBRID INTAKE SCREEN ASSEMBLY

CROSS-REFERENCE TO RELATED APPLICATION

This application claims benefit of U.S. Provisional Patent Application Ser. No. 61/529,162, filed Aug. 30, 2011, the contents of which are herein incorporated by reference in their entirety.

BACKGROUND OF THE INVENTION

1. Field of the Invention

Embodiments of the invention relate to intake screen assemblies.

2. Description of the Related Art

Water collection systems are typically used to provide water to end users such as manufacturing plants, cities, irrigation systems, and power generation facilities located adjacent a body of water such as a river, lake, or salt water bodies. The end users may employ this type of system as an alternative to drilling water well or buying water from a municipality. Additionally, use of these systems may be determined by the location of the end user, for example remote locations where water from a municipal source and/or electrical power to operate pumps is not readily available. These water collection systems have the ability to adapt to varying conditions and deliver water efficiently and economically.

These water collection systems typically use an inlet pipe adapted to transport water from a position submerged in a body of water to the end user adjacent the body of water. An inlet pipe is submerged in the body of water and the end of the inlet pipe is typically coupled to an intake screen assembly which typically has a plurality of filtering members. The filtering members are configured to prevent waterborne debris and aquatic life, of a certain size, from entering the inlet pipe.

A common intake screen assembly generally comprises large cylindrical screens with a closure on one end and a pipe connection on the other end. A typical construction for large intake screen assemblies is a flanged tee section with two screen cylinders that are cantilevered from opposite ends of the tee section, and with solid closures such as flat plates, cones, or dished heads on the distal ends of each screen cylinder. The separate components of the assemblies are usually welded together.

The material used to fabricate the separate components is generally stainless steel. However, where certain aquatic animals, such as zebra mussels, are present the preferred material is a copper-nickel alloy. Since copper-nickel alloys are more expensive than stainless steel, it is preferred to supply a hybrid assembly where only the cylindrical screen portion is formed from copper-nickel and the remainder of the assembly is formed from stainless steel.

Traditionally the hybrid assembly has been accomplished by fabricating a copper-nickel cylindrical screen and bolting it the rest of the stainless steel components. There are two potential problems with the hybrid assembly. First, in high loading situations, significant reinforcement of the cylindrical screen is required since the copper-nickel material is not as strong as the stainless steel material. The reinforcing must be designed to transfer through the bolts, which may increase the cost and complexity of manufacture. Second, the cylindrical screen must be bolted to the stainless steel components using gaskets and isolation sleeves to prevent contact of the two dissimilar metals, thereby preventing galvanic corrosion. These additional corrosion protection measures may also increase the cost and complexity of manufacture.

Therefore, there is a need for new and improved hybrid intake screen assemblies.

SUMMARY OF THE INVENTION

In one embodiment, an intake screen assembly comprises an intake member; a screen support member coupled to the intake member; and a screen member coupled to the screen support member, wherein the screen support member and the screen member are formed from different materials. The intake member and/or the screen support member may be formed from stainless steel, and the screen member may be formed from copper-nickel.

In one embodiment, a method of forming an intake screen assembly comprises coupling a screen support member to an intake member; and coupling a screen member to the screen support member. The screen support member and the screen member may be formed from different materials.

In one embodiment, an intake screen assembly comprises an intake member; a support structure coupled to the intake member, wherein the support structure includes, a plurality of circumferential supports; and a plurality of straight bars coupled to the circumferential supports that extend from a first end of the support structure to a second end of the support structure in a zig-zag pattern around the circumference of the support structure; and a plurality of filter members coupled to the support structure for filtering fluid flow into the intake member.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
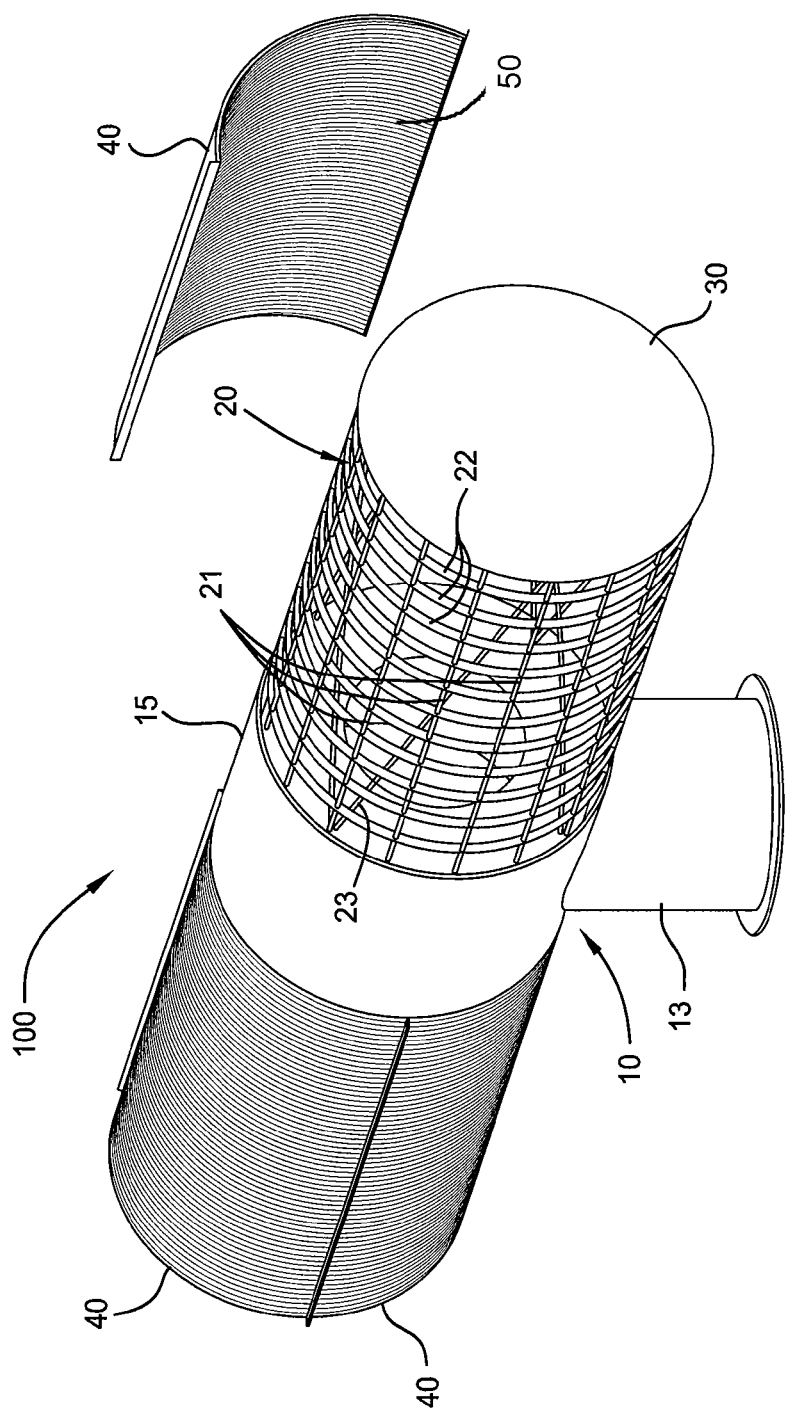
FIG. 1 illustrates an intake screen assembly according to one embodiment.

FIG. 1 illustrates an intake screen assembly 100 according to one embodiment. The intake screen assembly 100 comprises an intake member or other body shown in the form of a central, flanged tee-section 10, a screen support member shown in the form of a cylindrical cage structure 20, a closure member shown in the form of a circular plate structure 30, and a screen member shown in the form of a curved screen panel 40. The right side of the intake screen assembly 100 is shown with the screen panels 40 removed to illustrate the underlying cage structure 20 and its connection to the tee-section 10 and the plate structure 30. The left side of the intake screen assembly 100 is illustrated with the screen panels 40 attached to outer surface of the opposite cage structure 20, which is hidden from view.

The intake screen assembly 100 utilizes a separate screen support member for supporting one or more screen members, which provides numerous advantages. By using a separate screen support member, the screen members themselves may be easily replaced without having to significantly disassemble the intake screen structure. Also, the screen support member may be formed from a material that is significantly stronger and/or more cost effective than the material used to form the screen members. The screen support member may further provide a solid base structure capable of withstanding high loading situations, while supporting one or more screen members. The screen members may therefore be formed from numerous other materials that provide significant benefits to the intake screen assembly 100, such as repelling certain aquatic life, but which do not necessarily require the support strength as the remaining components of the assembly.

The components of the intake screen assembly 100 may be formed from different materials or from the same material. The components may be formed from metallic materials, non-metallic materials, and composite materials. The screen member may be formed from one or more materials that are stronger than the materials used to form the screen members. The components of the intake screen assembly 100 may be formed from dissimilar materials that do not require additional corrosion protection measures.

In one embodiment, the tee-section 10, the cage structure 20, and/or the plate structure 30 may be formed from a stainless steel material (such as 304 or 316 grade stainless steel), and the screen panels 40 may be formed from a copper-nickel material. In one embodiment, the tee-section 10, the cage structure 20, the plate structure 30, and/or the screen panels 40 may be formed from the same material, such as stainless steel or copper-nickel. Appropriate corrosion protection measures may be used when coupling the components of the intake screen assembly 100 that are formed from dissimilar materials, such as the stainless steel cage structure 20 and the copper-nickel screen panels 40. The corrosion protection members 50 may be used to prevent direct surface contact between components of the intake screen assembly 100 of dissimilar materials. In one example, one or more gasket-type and/or washer-type members may be used between adjacent surfaces of the dissimilar material components. In another example, one or more isolation-type sleeves may also be used for isolating the bolt/nut members that are used for forming bolted connections with assembly components of dissimilar materials as described herein.

The tee-section 10 generally includes a cylindrical lower portion 13 for supporting the intake screen assembly 100 when submerged in a body of water, and/or for coupling to a flow line for providing fluid communication to an end user. A cylindrical upper portion 15 of the tee-section 10 may be provided for supporting the cage structures 20, the plate structures 30, and the screen panels 40. The cage structures 20 may be welded to opposite ends of the upper portion 15 of the tee section 10 in a cantilevered fashion, and the plate structures 30 may be welded to the distal ends of the cage structures 20. Other connection mechanisms, such as bolting, may be used to connect the components of the intake screen assembly 100 together.

Although illustrated as a tee-section 10, the body of the intake screen assembly 100 may include other configurations. In one embodiment, the body may be in the form of an L-shaped section for supporting only one cage structure 20 of the assembly. In one embodiment, the tee-section 10 may include only the lower portion 13 for supporting one cage structure 20 that is horizontally or vertically positioned on top of the lower portion 13. Other configurations and shapes of the body may be used with the embodiments described herein.

The cylindrically-shaped cage structure 20 may be formed from a plurality of bars 21 (or other similar longitudinal support or reinforcing members) that interconnect a plurality of circumferential supports 22 (such as ring members). Additional bars, referred to as reinforcing members 23, may be provided along the inner and/or outer diameter of the cage structure 20. Examples of reinforcing members 23 are disclosed in U.S. Pat. No. 7,950,527, the contents of which are herein incorporated by reference in its entirety, which describes internal reinforcing helical bars that can be used with the embodiments described herein. In one embodiment, the reinforcing members 23 may include a plurality of helical bars which traverse the cage structure 20. In one embodiment, a first end of at least two reinforcing members 23 may be coupled to the tee-section 10 at substantially the same location. The reinforcing members 23 extend toward the plate structure 30 in a manner that creates an angle between the two members 23. The reinforcing members 23 may be arranged to have the same contour as the screen panels 40, and may contact with the screen panels 40 as the members 23 extend from the first end to a second end of the members 23. The second end of the reinforcing members 23 may be coupled to the plate structure 30. The members 23 may form a zig-zag pattern as they traverse the cage structure 20. The angles between the reinforcing members 23 may be any angle necessary for the operation. The larger the angle, the longer the members 23 may need to be in order to traverse a longer section of the cage structure 20. Any number of angles may be used.

In one embodiment, the length and/or diameter of the cage structure 20 may be within a range of about 6-12 inches to about 8-12 feet. In one embodiment, the length of the cage structure 20 may be the same dimension as the diameter of the cage structure 20, thereby forming a square cylinder arrangement. Although illustrated as a cylindrical cage structure 20, the screen support member of the intake screen assembly 100 may also include other configurations and shapes, such as a substantially flat-sided screen support structure/member.

The flat, cylindrical plate structures 30 may be coupled to the ends of the cage structures 20, such as by welding, to form sealed closed ends of the intake screen assembly 100. Other embodiments may include dished head members or fabricated cone members for coupling to the ends of the cage structures 20. U.S. Pat. No. 7,950,527, the contents of which are herein incorporated by reference in its entirety, illustrates a cone-shaped end cap 117 that can be used with the embodiments described herein. Various other shapes and configurations of closure members may also be used with the embodiments described herein. In one embodiment, the cage structure 20 (or screen support member) and the plate structure 30 (or end closure member) may be integrally formed as a single piece component of the intake screen assembly 100.

The screen panels 40 are operable to filter and/or repel debris, aquatic life, and other matter from the fluid flow into the intake screen assembly 100. The screen panels 40 may be directly coupled to the outer surface of the cage structures 20, the tee section 10, and/or the plate structures 30. As illustrated in FIG. 1, three partially cylindrical screen panels 40 may be used to enclose the cage structure 20. Any number of screen panels 40 may used with the embodiments described herein. Although illustrated as curved screen panels 40, the screen members of the intake screen assembly 100 may also include other configurations and shapes, such as a substantially flat-sided screen panel/member.

In one embodiment, the screen panels 40 may be coupled to each other, such as by bolting or other connection mechanisms, to form a sleeve that can form an interference fit around the cage structure 20. In one embodiment, the ends of one or more screen panels 40 may be coupled together in a segmented fashion, such as by using a hinged connection. The screen panels 40 may be rotatable about each hinged connection for installation around the cage structure 20. In one embodiment, the screen panels 40 may be coupled to the tee section 10 at one end and to the plate structure 30 at the opposite end using a bolted connection. In one embodiment, the screen panels 40 may be coupled to the cage structure 20 at one or more locations using bolted connections. In one embodiment, the screen panel 40 may be in the form of a unitary cylindrical sleeve. The unitary cylindrical sleeve may be installed by sliding the sleeve over the cage structure 20. The unitary cylindrical sleeve may be retained using an interference fit or a bolted connection. In one embodiment, the sleeve may be heated and thereby expanded to slide over the cage structure 20, and subsequently cooled to form the interference fit to the cage structure 20. In one embodiment, the cage structure may be cooled and thereby contracted to slide the sleeve over the cage structure 20, and subsequently heated to form the interference fit with the sleeve. In one embodiment, the screen panel 40 may be in the form of a sheet of material. The sheet of material may be assembled by tightly wrapping the sheet of material around the cage structure 20 to form an interference fit or by using a bolted connection as described herein. In one embodiment, the screen panel 40 may include a plurality of spaced wires, ribs, mesh, and/or perforated sheets. As stated above, appropriate corrosion protection measures, such as gasket, washer, and/or isolation sleeve type members, may be used for the connections between the components of dissimilar materials.

The intake screen assembly 100 may also include a primary and/or secondary flow modifier disposed within the assembly. The flow modifies may include tubular members configured to evenly distribute the fluid flow through the assembly 100. U.S. Pat. Nos. 7,950,527, 6,712,959, and 6,051,131, the contents of which are herein incorporated by reference in their entireties, disclose screen assemblies with primary and secondary flow modifiers that may be used with the embodiments described herein.

Figure 2A:
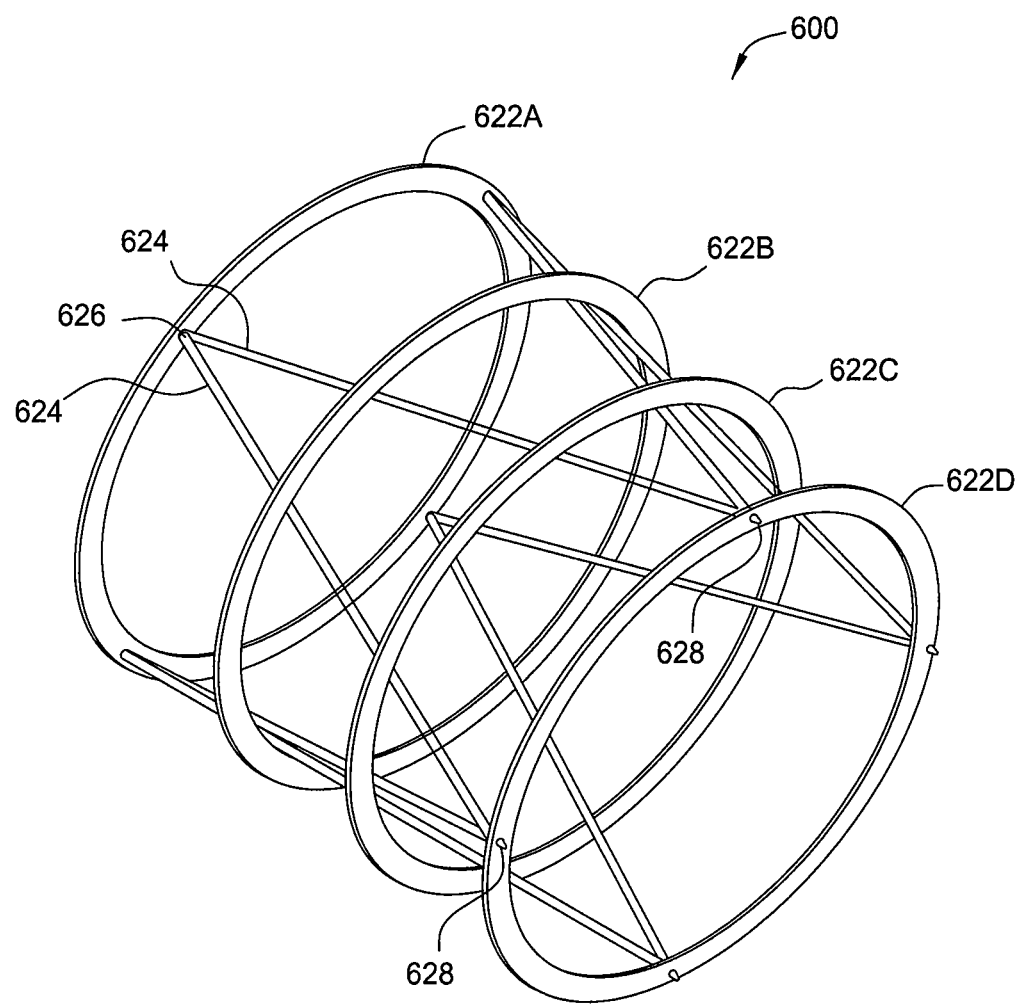
FIGS. 2A and 2B illustrate a support structure according to one embodiment.
Figure 2B:
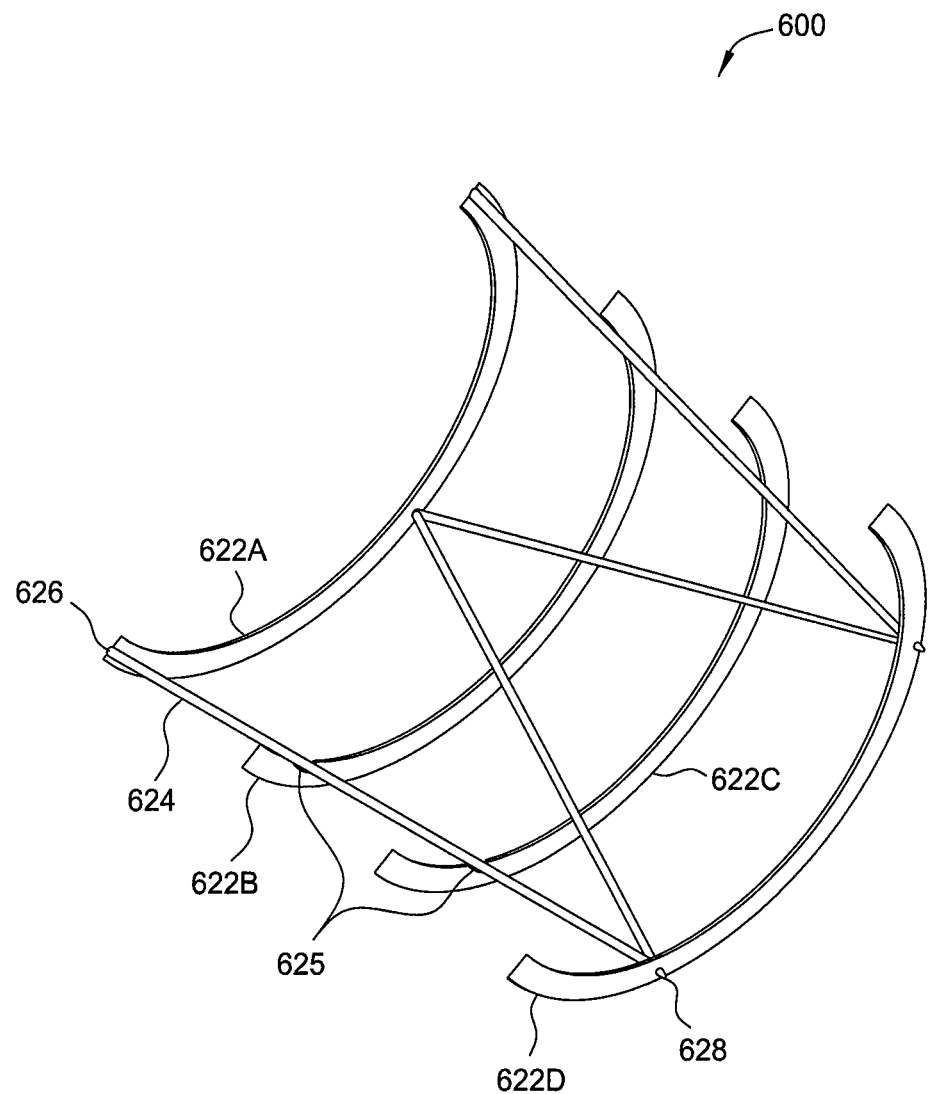

FIGS. 2A and 2B illustrate a support structure 600 (such as cage structure 20) that may be used with the embodiments of the assembly 100 described herein and vice versa. The support structure 600 may include one or more circumferential supports 622A-D (such as circumferential supports 22) and one or more bars 624 (such as bars 21 and/or reinforcing members 23). The support structure 600 may be coupled at one end directly to an intake member, such as the tee-section 10, and/or via a support member, such as a plate member. A closure member, such as plate structure 30, may also be coupled to the support structure 600 at an opposite end. A plurality of screen members or panels, such as screen panels 40, may also be coupled to the support structure 600 to filter fluid flow into the support structure 600.

As illustrated, the bars 624 may comprise straight tubular-type members. The bars 624, however, may be solid, hollow, and/or include circular or polygonal shaped cross sections. A first end 626 of at least two bars 624 may be coupled together and/or at the same location to the circumferential support 622A (and/or the tee-section 10). The opposite or second end 628 of the at least two bars 624 may be coupled at different locations to the circumferential support 622D (and/or the plate structure 30), thereby forming a V-shape or zig-zag configuration. The second end 628 of the at least two bars 624 may be similarly coupled together and/or at the same location to the circumferential support 622D with the ends of two other bars 624. The bars 624 may form a zig-zag pattern around the circumference of the circumferential supports 622A-D. In one embodiment, the bars 624 may be angled and oriented in the same direction around the circumference of the circumferential supports 622A-D. The bars 624 may be arranged in other types of patterns known in the art. The bars 624 provide a truss-type support structure operable resist axial (tension and/or compression) and torsional loads applied to the support structure 600.

The bars 624 may be coupled to the circumferential supports 622A-D in a non-longitudinal straight line. The bars 624 may be disposed at an angle relative to the longitudinal axis of the support structure 600 and/or the central axis of one or more of the circumferential supports 622A-D. The first end 626 and the second end 628 of each bar 624 may be coupled to the circumferential support 622A and the circumferential support 622D, respectively, at different longitudinal locations.

Figure 2C:
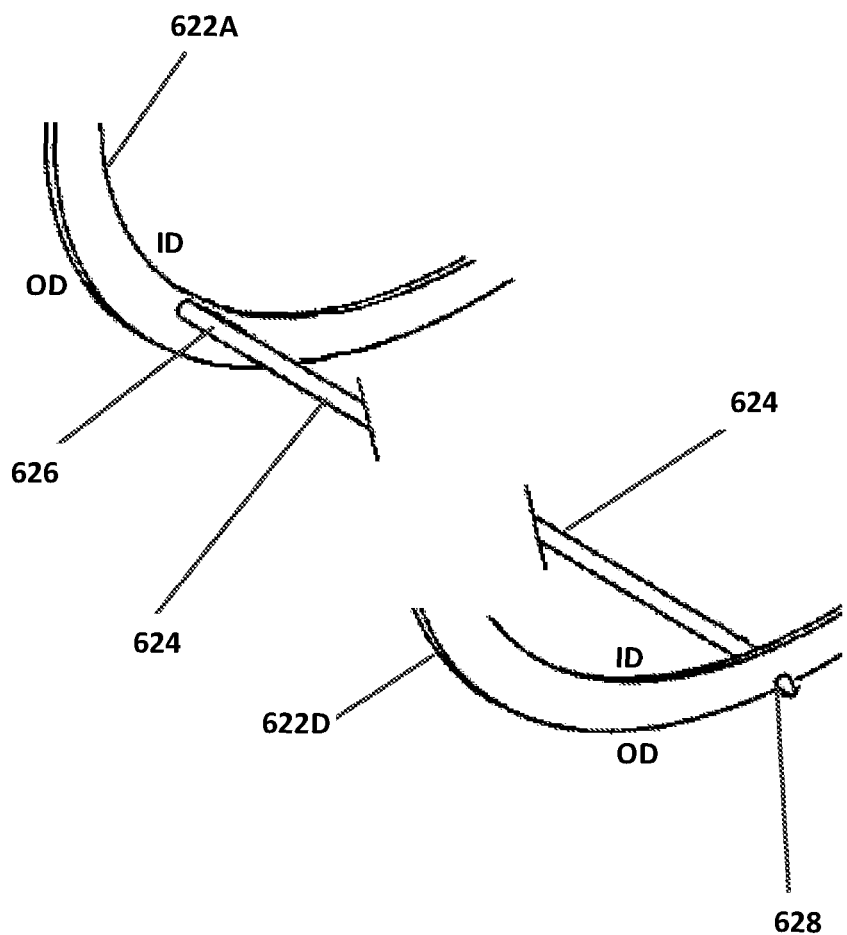
FIG. 2C illustrates a sectional view of a support structure according to one embodiment.

As illustrated in FIG. 2B, the first and second end 626, 628 of the bars 624 may be coupled to the top or bottom surfaces of the circumferential supports 622A, 622D. In one embodiment, illustrated in FIG. 2C, the first end 626 of the bars 624 may be coupled further from (or closer to) the outer diameter OD of the circumferential support 622A, while the second end 628 of the bars may be coupled further from (or closer to) the inner diameter ID of the circumferential support 622D. In one embodiment, the first end 626 and the second end 628 of the bars 624 may be coupled to the inner and/or outer diameters of the circumferential supports 622A, 622D.

In one embodiment, as illustrated in FIG. 2B, the bars 624 may contact the inner diameter of the intermediate circumferential supports 622B, 622C that are disposed between the outermost circumferential supports 622A, 622D. In one embodiment, the bars 624 may not contact the inner diameter of the intermediate circumferential supports 622B, 622C. In one embodiment, the circumferential supports 622A-D may include one or more grooves 625 along the inner surface (and/or along the outer surface) for securing and supporting the bars 624 along the longitudinal length of the support structure 600. In one embodiment, the inner (and/or outer) diameter of the intermediate circumferential supports 622B, 622C may be oversized and/or undersized relative to the outermost circumferential supports 622A, 622D to provide and/or prevent contact with the bars 624. In one embodiment, the bars 624 may be disposed through one or more of the circumferential supports 622A-D. In one embodiment, one or more clamp-type members may be used to secure the bars 624 to the circumferential supports 622A-D.

One or more bars 624 may be coupled to the inner diameter and/or outer diameter of one or more circumferential supports 622A-D. In one embodiment, a plurality of screen/filter/panel members, such as wires, ribs, mesh, and/or perforated sheets may be coupled to and supported directly by the outer and/or inner surfaces of one or more bars 624 and/or one or more circumferential supports 622A-D. In one embodiment, one or more components (e.g. members/bars 23, 624, circumferential supports/rings 622A-D, 22, longitudinal supports 120, tee-section 10, plate structures 30, screen members/panels 40, etc.) of the assemblies described herein may be formed integral with or separate from one or more other components of the assemblies. One more components may be coupled to one or more other components by welded, screwed, and/or bolted connections, by simple contact with (e.g. resting against) another component, and/or by other ways known in the art. One or more of the embodiments described herein may be used in whole or part with one or more other embodiments described herein.

While the foregoing is directed to embodiments of the invention, other and further embodiments of the invention may be devised without departing from the basic scope thereof, and the scope thereof is determined by the claims that follow.

The invention claimed is:

1. An intake screen assembly, comprising:
   an intake member;
   a screen support member coupled to the intake member, wherein the screen support member further comprises a plurality of circumferential supports, one or more longitudinal supports and one or more straight reinforcing bars, wherein the plurality of circumferential supports further comprise a first outermost circumferential support and a second outermost circumferential support, and one or more intermediate circumferential supports disposed between the first and second outermost circumferential supports, wherein:
      a first end of one of the one or more straight reinforcing bars is coupled to the first outermost circumferential support and a second end of the one of the one or more straight reinforcing bars is coupled to the second outermost circumferential support, the first end being coupled to the first outermost circumferential support at a first distance from an inner diameter of the first outermost circumferential support, the second end being coupled to the second outermost circumferential support at a second distance from an inner diameter of the second outermost circumferential support, the first distance being greater than the second distance; and
   a screen member coupled to the screen support member, wherein the screen member defines a longitudinal axis and wherein at least one of the one or more straight reinforcing bars does not contact the screen member and is oriented at a first angle with respect to the longitudinal axis.

2. The assembly of claim 1, wherein the screen support member and the screen member are formed from different materials, wherein the screen support member is formed from stainless steel, and wherein the screen member is formed from copper-nickel.

3. The assembly of claim 1, further comprising a closure member coupled to a distal end of the screen support member.

4. The assembly of claim 1, further comprising a corrosion protection member disposed between the screen support member and the screen member.

5. The assembly of claim 1, wherein the screen member comprises a plurality of screen panels that are coupled together to form a sleeve that is interference fit around the screen support member.

6. The assembly of claim 1, wherein the screen member is in the form of a sleeve that slides over the screen support member.

7. The assembly of claim 1, wherein the intake member is in the form of a flanged tee-section, and wherein the screen support member is in the form of a cage structure.

8. The assembly of claim 1, wherein opposite ends of the one or more straight reinforcing bars are coupled to the first and second outermost circumferential supports at different longitudinal locations to form a truss-type support structure.

9. The assembly of claim 8, wherein:
   the screen support member is positioned in an interior of the screen member; and
   the one or more straight reinforcing bars contact the first and second outermost circumferential supports at top or bottom surfaces of the first and second outermost circumferential supports and do not contact at least one of the one or more intermediate circumferential supports.

10. The assembly of claim 1, Begin wherein each of the one or more intermediate circumferential supports defines an inner diameter, wherein one or more of the intermediate circumferential supports further comprises one or more grooves along its inner diameter, wherein the one or more straight reinforcing bars are disposed in at least one of the one or more grooves.

11. The assembly of claim 1, wherein the one or more straight reinforcing bars extend through at least one of the plurality of circumferential supports.

12. The assembly of claim 1, wherein the plurality of circumferential supports are sized such that the one or more straight reinforcing bars contact each of the plurality of circumferential supports, wherein each of the one or more intermediate circumferential supports defines an inner diameter, wherein the inner diameter of at least one of the one or more intermediate circumferential supports is greater or smaller than the inner diameter of the first or second outermost circumferential supports to provide contact with the one or more straight reinforcing bars.

13. A method of forming an intake screen assembly, the intake screen assembly comprising an intake member, a screen support member, wherein the screen support member further comprises a plurality of circumferential supports, one or more longitudinal supports and one or more straight reinforcing bars, and a screen member, wherein the screen member defines a longitudinal axis, wherein the plurality of circumferential supports further comprise a first outermost circumferential support and a second outermost circumferential support, and one or more intermediate circumferential supports disposed between the first and second outermost circumferential supports, wherein the method comprises:
   coupling a screen support member to an intake member; and
   coupling a screen member to the screen support member, such that at least one of the one or more straight reinforcing bars does not contact the screen member and is oriented at a first angle with respect to the longitudinal axis, wherein a first end of one of the one or more straight reinforcing bars is coupled to the first outermost circumferential support and a second end of the one of the one or more straight reinforcing bars is coupled to the second outermost circumferential support, the first end being coupled to the first outermost circumferential support at a first distance from an inner diameter of the first outermost circumferential support, the second end being coupled to the second outermost circumferential support at a second distance from an inner diameter of the second outermost circumferential support, the first distance being greater than the second distance;
   wherein the screen support member and the screen member are formed from different materials.

14. The method of claim 13, wherein the screen member is in the form of a sleeve, and further comprising sliding the sleeve over the screen support member to thereby couple the screen member to the screen support member.

15. The method of claim 14, wherein the sleeve forms an interference fit with the screen support member or is bolted to the screen support member.

16. The method of claim 13, wherein the screen member comprises a plurality of screen panels, and further comprising coupling the screen panels together around the screen support member to thereby couple the screen member to the screen support member.

17. The method of claim 16, wherein the screen panels are coupled together to form a sleeve that is interference fit with the screen support member, or wherein the screen panels are couple to the screen support member using bolted connections.

18. The method of claim 13, wherein the screen support member is formed from stainless steel, and wherein the screen member is formed from copper-nickel.

19. The method of claim 13, further comprising providing a corrosion protection member between the screen support member and the screen member.

20. The method of claim 13, wherein the intake member is in the form of a flanged tee-section, and wherein the screen support member is in the form of a cage structure.

21. An intake screen assembly, comprising:
an intake member;
a support structure coupled to the intake member, wherein the support structure includes:
  a plurality of circumferential supports;
  one or more longitudinal supports; and
one or more straight reinforcing bars coupled to the circumferential supports that extend from a first end of the support structure to a second end of the support structure in a zig-zag pattern around the circumference of the support structure, wherein the plurality of circumferential supports further comprise a first outermost circumferential support and a second outermost circumferential support, and one or more intermediate circumferential supports disposed between the first and second outermost circumferential supports, wherein:
  a first end of one of the one or more straight reinforcing bars is coupled to the first outermost circumferential support and a second end of the one of the one or more straight reinforcing bars is coupled to the second outermost circumferential support, the first end being coupled to the first outermost circumferential support at a first distance from an inner diameter of the first outermost circumferential support, the second end being coupled to the second outermost circumferential support at a second distance from an inner diameter of the second outermost circumferential support, the first distance being greater than the second distance; and
a plurality of filter members coupled to the support structure for filtering fluid flow into the intake member, wherein the filter members define a longitudinal axis and wherein at least one of the one or more straight reinforcing bars does not contact the plurality of filter members and is oriented at a first angle with respect to the longitudinal axis.

22. The assembly of claim 21, wherein opposite ends of the one or more straight reinforcing bars are coupled to the first and second outermost circumferential supports at different longitudinal locations.

23. The assembly of claim 21, wherein the one or more straight reinforcing bars do not contact at least one intermediate circumferential support disposed between the first and second outermost circumferential supports.

24. The assembly of claim 21, wherein the one or more straight reinforcing bars contact at least one intermediate circumferential support disposed between the first and second outermost circumferential supports.

25. The assembly of claim 21, wherein the one or more straight reinforcing bars are disposed in a groove of at least one intermediate circumferential support disposed between the first and second outermost circumferential supports.

26. The assembly of claim 21, wherein the one or more straight reinforcing bars extend through at least one intermediate circumferential support disposed between the first and second outermost circumferential supports.

27. The assembly of claim 21, wherein the one or more straight reinforcing bars are secured by a clamp member to at least one intermediate circumferential support disposed between the first and second outermost circumferential supports.

* * * * *